United States Patent
Spaggiari

(10) Patent No.: US 7,923,877 B2
(45) Date of Patent: Apr. 12, 2011

(54) DIRECT CURRENT MOTOR WITH PERMANENT MAGNET STATOR

(75) Inventor: Alessandro Spaggiari, Correggio (IT)

(73) Assignee: Spal Automotive S.r.l., Correggio (Reggio Emilia) (IT)

( * ) Notice: Subject to any disclaimer, the term of this patent is extended or adjusted under 35 U.S.C. 154(b) by 100 days.

(21) Appl. No.: 12/312,217

(22) PCT Filed: Nov. 9, 2007

(86) PCT No.: PCT/IB2007/003424
§ 371 (c)(1),
(2), (4) Date: Apr. 30, 2009

(87) PCT Pub. No.: WO2008/056243
PCT Pub. Date: May 15, 2008

(65) Prior Publication Data
US 2010/0301694 A1    Dec. 2, 2010

(30) Foreign Application Priority Data
Nov. 9, 2006    (IT) ............................... BO2006A0762

(51) Int. Cl.
*H02K 21/30*    (2006.01)
(52) U.S. Cl. ......... 310/154.29; 310/154.35; 310/154.39; 310/154.42

(58) Field of Classification Search .................. 310/140, 310/185, 198, 154.01, 154.21, 154.22, 154.26–154.29, 310/154.34, 154.35, 154.39, 154.42
See application file for complete search history.

(56) References Cited

U.S. PATENT DOCUMENTS

| | | | | |
|---|---|---|---|---|
| 3,594,599 | A * | 7/1971 | West | 310/164 |
| 4,217,508 | A * | 8/1980 | Uzuka | 310/46 |
| 4,280,072 | A * | 7/1981 | Gotou et al. | 310/67 R |
| 4,847,526 | A * | 7/1989 | Takehara et al. | 310/185 |
| 5,105,113 | A * | 4/1992 | Ishikura et al. | 310/154.29 |
| 6,091,220 | A * | 7/2000 | Redelberger | 318/653 |
| 6,566,775 | B1 | 5/2003 | Fradella | |
| 2007/0138892 | A1 | 6/2007 | Horst | |

FOREIGN PATENT DOCUMENTS

| | | |
|---|---|---|
| EP | 0 076 206 | 4/1983 |
| EP | 0 798 842 A1 | 10/1997 |
| EP | 1 424 762 A1 | 6/2004 |

* cited by examiner

*Primary Examiner* — Dang D Le
(74) *Attorney, Agent, or Firm* — The Nath Law Group; Jerald L. Meyer; Stanley N. Protigal

(57) ABSTRACT

Described is a direct current motor (1) with permanent magnet stator, having at least four stator poles (5, 6, 7, 8) which are spaced at equal angular intervals about the rotation axis (A) of the rotor (3) and which generate a magnetic field that is asymmetrical about the rotation axis (A) of the rotor (3) and where the rotor winding (4) can be powered partially and selectively at least at two fixed, explementary angular sectors.

14 Claims, 2 Drawing Sheets

DIRECT CURRENT MOTOR WITH PERMANENT MAGNET STATOR

This is a National Phase Application of PCT/IB2007/003424 filed 09 Nov. 2007 claiming priority from IT Application No. BO2006A000762, dated 09 Nov. 2006, the entire content of which is hereby incorporated by reference in its entirety.

TECHNICAL FIELD

This invention relates to a direct current motor with permanent magnet stator, in particular of the type having at least four stator poles.

The direct current motor according to this invention can be used advantageously, though not exclusively, to drive an axial fan, especially one for the automotive industry.

This specification refers, without in any way limiting the scope of the invention, to direct current motors with permanent magnet stators having four stator poles.

BACKGROUND ART

Direct current motors with four stator poles are known in prior art, especially for driving axial fans. They comprise an outer casing, a rotor with a respective winding, two positively polarized brushes, two negatively polarized brushes and four permanent magnet stators.

Normally in this type of motor, the brushes are identical and spaced at equal angular intervals of 90° about the axis of rotation of the motor and diametrically opposite brushes, with the same polarity, are electrically connected to each other. The permanent magnets, also identical to each other, are made of ferrite and each one is radially aligned with a respective brush. The motor thus has two identical machine sections operating in parallel.

The speed of these motors can be adjusted for example by varying the supply voltage of the brushes using external dissipative elements such as voltage dividers, for example. This type of adjustment, besides being unsatisfactory because of the need to provide the dissipative elements, is also inefficient for all applications where only a limited number of predetermined speeds are required: for example a low speed and a high speed.

DISCLOSURE OF THE INVENTION

This invention has for an aim to provide a direct current motor with permanent magnet stator, having at least four stator poles, that can operate at least at two speeds that can be selected separately and without the aid of external dissipative elements.

Another aim of the invention is to provide a direct current motor with permanent magnet stator, having at least four stator poles, that can operate at least at two speeds which can be selected separately, without the aid of external dissipative elements, and whose values are sufficiently distant from each other.

Yet another aim of the invention is to provide a direct current motor with permanent magnet stator, having at least four stator poles, that can operate at least at two speeds selectable separately without the aid of external dissipative elements, and which can be derived, with a limited number of design changes and maintaining its power at maximum speed, from an existing direct current motor with permanent magnet stator whose speed is adjusted by means of external dissipative elements.

Yet another aim of the invention is to provide a direct current motor with permanent magnet stator, having at least four stator poles, that can operate at least at two speeds selectable separately without the aid of external dissipative elements, and which can be derived, with a limited number of design changes that do not alter its overall dimensions, from an existing direct current motor with permanent magnet stator whose speed is adjusted by means of external dissipative elements.

Yet another aim of the invention is to provide a direct current motor with permanent magnet stator, having at least four stator poles, that can operate at least at two speeds selectable separately without the aid of external dissipative elements, and which is inexpensive to construct in existing production lines for direct current motors with permanent magnet stators whose speed is adjusted by means of external dissipative elements.

To achieve the aforementioned aims, the invention accordingly provides a direct current motor with permanent magnet stator as described in the appended claims.

BRIEF DESCRIPTION OF THE DRAWINGS

The invention will now be described with reference to the accompanying drawings which illustrate a preferred embodiment of it and in which.

DETAILED DESCRIPTION OF THE PREFERRED EMBODIMENTS OF THE INVENTION

Figure 1:
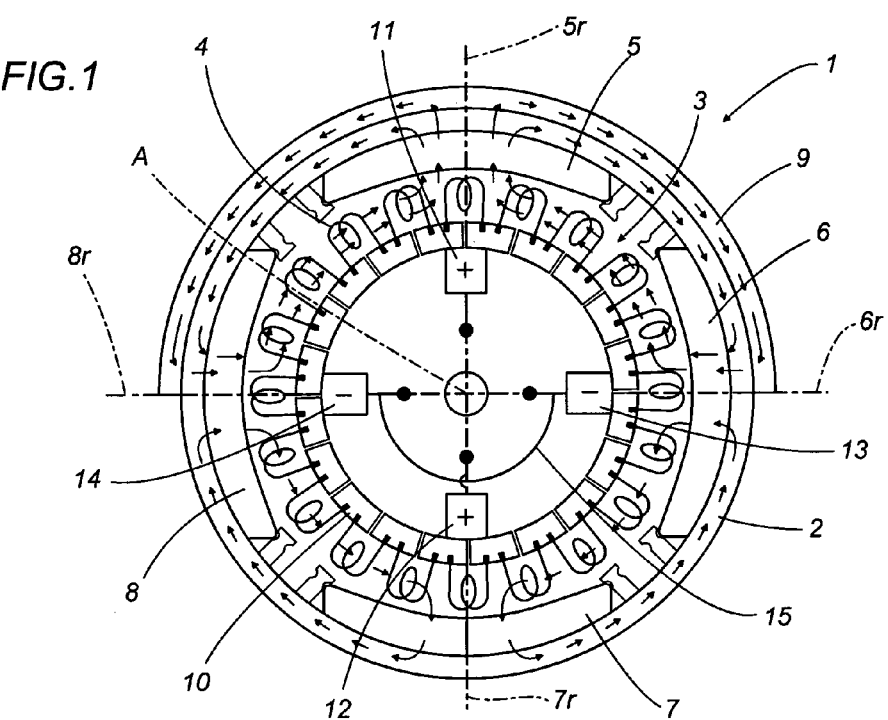
FIG. 1 is a schematic side view of a first embodiment of the direct current motor with permanent magnet stator according to the invention.

With reference to FIG. 1, the numeral 1 denotes in its entirety a direct current motor with permanent magnet stator.

The motor 1 comprises a substantially cylindrical outer casing 2, that houses a rotor 3 with an overlapping winding 4 and four stator poles 5, 6, 7, 8 normally spaced at substantially equal angular intervals about the rotation axis A of the rotor 3.

The pole 5 comprises a high-power permanent magnet, made for example of neodymium-iron-boron, while the poles 6, 7 and 8 comprise respective relatively low-power permanent magnets, in particular of ferrite, that may be higher than grade two, so that the magnetic field generated is asymmetrical about the rotation axis A of the rotor 3. In particular, as illustrated in FIG. 1, the magnetic field is more intense at and in the vicinity of the pole 5, and less intense at and in the vicinity of the pole 7.

The permanent magnet of the pole 5 is the same as the permanent magnets of the poles 6, 7 and 8 in shape and in all dimensions except, where necessary, axial length which, in the permanent magnets of the poles 6, 7 and 8, may be shorter in order to further increase the magnetic asymmetry of the motor 1.

The rotation axis A of the rotor 3 and the angular positions of the permanent magnets of the poles 5, 6, 7 and 8 define four radial directions 5r, 6r, 7r, 8r, about each of which the respective magnets are symmetrically positioned.

The casing 2 is made of ferromagnetic material so that the flux lines generated by the poles 5, 6, 7 and 8 are closed by the casing 2 itself.

For example, at the pole 5, where the magnetic field is more intense, the flux lines are closed not only by the casing 2 but also by a ferromagnetic yoke structure 9. The yoke structure 9 is fitted outside the casing 2 and bears against the latter's lateral surface over an arc of 180°, that is to say, between the directions 6r and 8r.

In a variant that is not illustrated, there is no yoke structure 9 and in its place the wall of the casing 2 is thicker.

The rotor winding 4 leads to an annular commutator 10 that bears against four fixed brushes located inside it, two positively polarized brushes 11 and 12, diametrically opposite each other, and two negatively polarized brushes 13 and 14, also diametrically opposite each other. More specifically, the brushes 11 and 12 are radially aligned with the pole 5 and with the pole 7, respectively, while the brushes 13 and 14 are radially aligned with the pole 6 and with the pole 8, respectively.

Obviously, the commutator may be of the external, frontal type and therefore the brushes are arranged in customary manner.

The brushes 13 and 14 are electrically connected to each other permanently by a bridge 15, while the brushes 11 and 12 are electrically isolated from each other and can be selectively powered by means of a customary switch that is not illustrated.

In other words, the rotor winding 4 can be powered partially and selectively at two fixed angular sectors, both of 180°, included between the brushes 13 and 14, one encompassing the brush 11 and, the other the brush 12. When the motor 1 is powered through the brushes 11, 13 and 14, the rotor winding 4 is powered at the 180° angular sector encompassing the pole 5 between the directions 6r and 8r, and the rotor 3 rotates at a first speed. When the motor 1 is powered through the brushes 12, 13 and 14, the rotor winding 4 is powered at the 180° angular sector encompassing the pole 7 between the directions 6r and 8r and the rotor 3 rotates at a second speed, higher than the first speed since, as mentioned above, the magnetic field is more intense at the pole 5.

Figure 2:
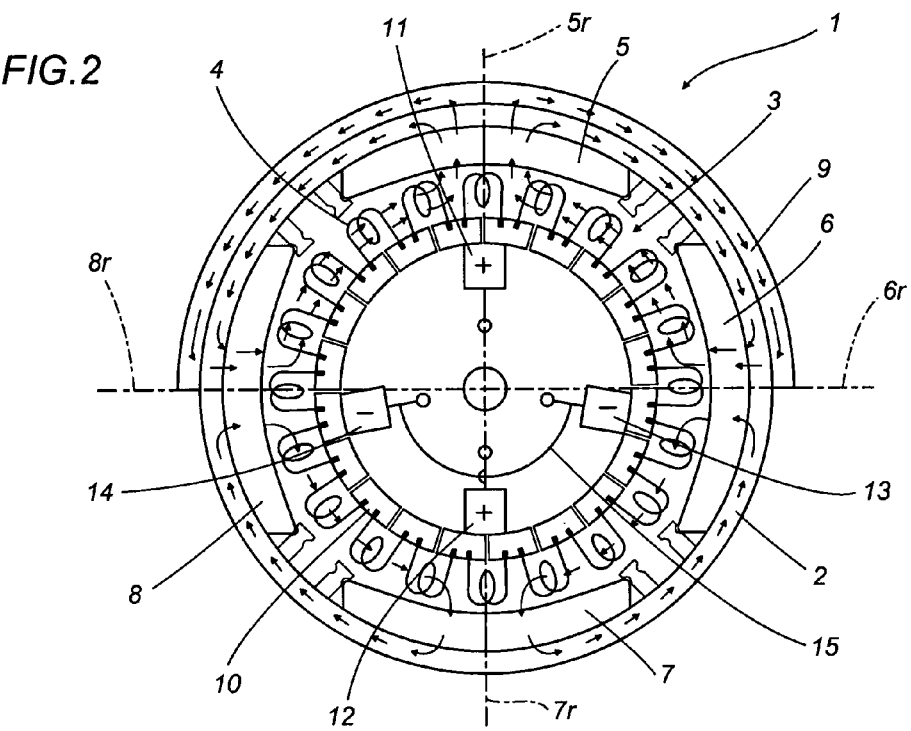
FIG. 2 shows a first variant of the motor of FIG. 1.

To increase the difference between the two operating speeds and as illustrated in the variant of FIG. 2, the brushes 13 and 14, while remaining angularly spaced, each on one side opposite the other, between the brushes 11 and 12, they are angularly spaced more closely from each other and from the pole 7.

The above mentioned angular sectors are therefore distributed asymmetrically about the rotation axis A of the rotor 3.

Thus, the magnetic field is more intense at the wider angular sector and less intense at the narrower angular sector. In other words, during operation at low speed, the active part of the rotor winding 4 interacts with a more intense magnetic field and has a larger number of coils whereas, during operation at high speed, the active part of the rotor winding 4 interacts with a weaker magnetic field and has a smaller number of coils.

Figure 3:
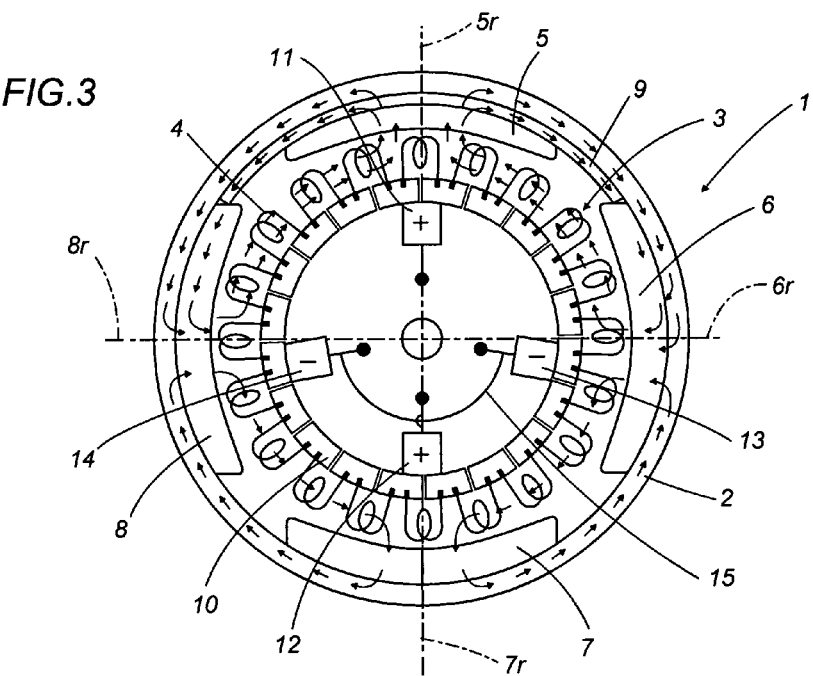
FIG. 3 shows a second variant of the motor of FIG. 1.

In the variant illustrated in FIG. 3 of the motor of FIG. 2, the ferromagnetic yoke structure 9 is located inside the casing 2, between the casing 2 and the permanent magnet of the pole 5 which, in this case, is thinner.

This solution limits the overall dimensions of the motor to the size of the casing 2 only and can also be applied to a variant of the motor of FIG. 1.

To increase the difference between the two operating speeds, according to another variant that may be applied to the motors of FIGS. 1, 2 and 3, the brush 11 may have a smaller commutator 10 contact surface than the brush 12.

Figure 4:
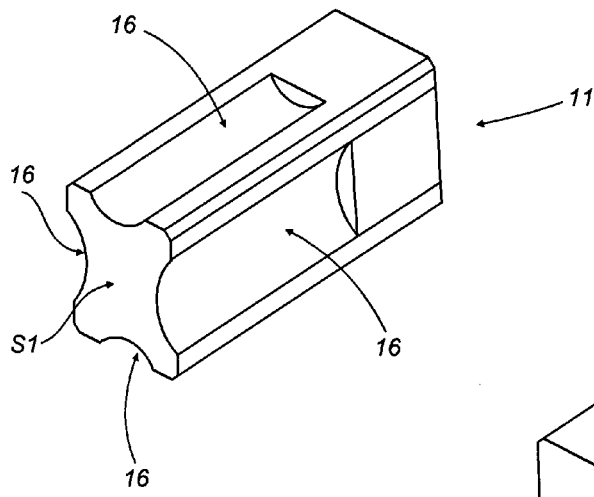
FIGS. 4 and 5 show two different embodiments of the brushes of the motor of FIG. 1, 2 or 3.

More specifically, as illustrated in FIG. 4, the brush 11 may be obtained from a brush identical to the brush 12 but having on each of its four sides a shallow groove 16 with a substantially cylindrical profile so as to create a reduced contact surface S1. This solution also reduces switching losses.

Figure 5:
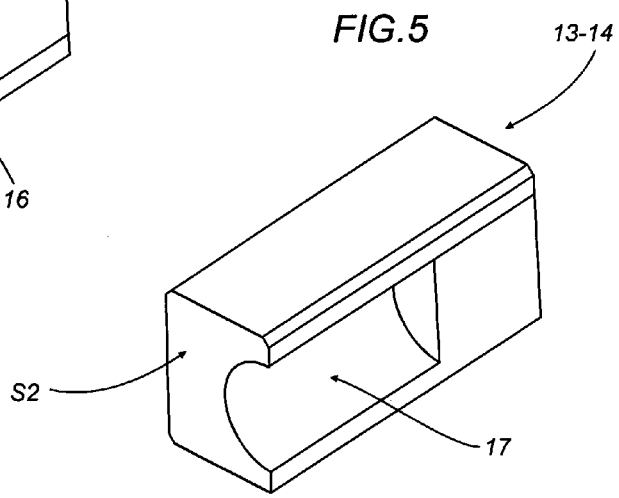

To increase the difference between the two operating speeds, the brushes 13 and 14 might also have smaller commutator 10 contact surfaces than the brush 12. More specifically, as illustrated in FIG. 5, each of the brushes 13 and 14 may be obtained from a brush identical to the brush 12 but having on one of its four sides a deep groove 17 with a substantially cylindrical profile so as to create a reduced contact surface S2. In this case too, switching losses can be reduced.

The invention achieves the above mentioned aims since the motor as claimed herein can operate at least at two speeds selectable separately without the aid of external dissipative elements and the two speeds are sufficiently different from each other.

Further, the motor can be derived, with a limited number of design changes that do not alter its overall dimensions and its power at maximum speed, from an existing direct current motor with permanent magnet stator whose speed is adjusted by means of external dissipative elements.

Moreover, the motor is inexpensive to construct in existing production lines for direct current motors with permanent magnet stators whose speed is adjusted by means of external dissipative elements.

In other variants that are not illustrated, the motor according to the invention might have n pole pairs and n brushes, where n is a number greater than or equal to 3, so as to obtain m operating speeds where m is a number greater than or equal to two. For example, the motor might have six stator poles spaced at equal angular intervals of 60° and six brushes, the negatively polarized brushes being connected to each other and the positively polarized brushes being isolated from each other and able to be selectively powered so as to drive the motor at a respective speed. Alternatively, two of the positively polarized brushes might be connected to each other and isolated from the third so as to drive the motor at two speeds. In these cases too, magnetic asymmetry may preferably be overridden by electrical asymmetry due to an asymmetrical distribution of the negatively polarized brushes and/or a different contact resistance of the brushes.

It should also be stressed that the motor described above purely by way of example may be further modified and adapted in several ways without thereby departing from the scope of the inventive concept as defined in the appended claims. Moreover, all the details of the invention may be substituted by technically equivalent elements.

Lastly, it should be noticed that moving the brushes necessarily means changing the connection of the windings so that the electrical and magnetic characteristics of the motor remain equivalent.

The invention claimed is:

1. A direct current motor with permanent magnet stator, comprising a rotor (3) with a respective winding (4) and at least four stator poles (5, 6, 7, 8) angularly spaced about the rotation axis (A) of the rotor (3), an outer casing (2), at least two positively polarized brushes (11, 12) and at least two negatively polarized brushes (13, 14) where the positively polarized brushes (11, 12) are radially aligned with respective stator poles (5, 7) and the two negatively polarized brushes (13, 14) are angularly spaced, each on one side opposite the other, between the positively polarized brushes (11, 12), wherein:

the rotor winding (4) can be powered partially and selectively at least at two fixed, explementary angular sectors, the stator poles (5, 6, 7, 8) generate a magnetic field that is asymmetrical about the rotation axis (A) of the rotor (3), and the negatively polarized brushes (13, 14) are electrically connected to each other, while at least two positively polarized brushes (11, 12) are electrically isolated from each other, are radially aligned, respectively, with a first stator pole (5) and with a second stator pole (7) that have different magnetic properties and can be selectively powered so that can drive the motor (1) at a respective speed.

2. The motor according to claim 1, wherein the fixed angular sectors are distributed asymmetrically about the rotation axis (A) of the rotor (3); the magnetic field generated by the stator poles (5, 6, 7, 8) being more intense at the widest angular sector and less intense at the other angular sectors.

3. The motor according to claim 1, wherein there are two fixed angular sectors distributed asymmetrically about the rotation axis (A) of the rotor (3); the magnetic field generated by the stator poles (5, 6, 7, 8) being more intense at the wider angular sector and less intense at the narrower angular sector.

4. The motor according to claim 1, wherein the two negatively polarized brushes (13, 14) are angularly spaced from the first stator pole (5) and the negatively polarized brushes (13, 14) are angularly spaced from the second stator pole (7) at different angular distances.

5. The motor according to claim 4, wherein the first stator pole (5) and the second stator pole (7) have respective permanent magnets that differ in power and/or size.

6. The motor according to claim 5, wherein the first stator pole (5) has at least one permanent magnet of neodymium-iron-boron, while the second stator pole (7) has at least one permanent magnet of ferrite.

7. The motor according to claim 6, wherein the second stator pole (7) has at least one permanent magnet of ferrite of grade higher than two.

8. The motor according to claim 6, wherein the two negatively polarized brushes (13, 14) are angularly spaced from the first stator pole (5) at a first angular distance and the negatively polarized brushes (13, 14) are angularly spaced from the second stator pole (7) at a second angular distance, and wherein the first angular distance is greater than the second angular distance.

9. The motor according to claim 8, wherein there are four stator poles (5, 6, 7, 8), wherein the first angular distance is greater than 180° and the second angular distance is the explement of the first angular distance.

10. The motor according to claim 6, wherein, at the first stator pole (5), it comprises a ferromagnetic yoke structure (9) for closing the flux.

11. The motor according to claim 10, wherein the yoke structure (9) is positioned outside the casing (2).

12. The motor according to claim 10, wherein the yoke structure (9) is positioned inside the casing (2), between the casing (2) and the permanent magnet.

13. The motor according to claim 6, wherein the casing (2) is ferromagnetic and is thicker at the first stator pole (5) for closing the flux.

14. The motor according to claim 6, wherein the commutator (10) contact surface of the positively polarized brush (11) that is radially aligned with the first stator pole (5) is smaller than that of the positively polarized brush (12) that is radially aligned with the second stator pole (7).

* * * * *